United States Patent
Koike et al.

(10) Patent No.: US 6,226,102 B1
(45) Date of Patent: *May 1, 2001

(54) IMAGE FORMING APPARATUS WHICH FORMS AN IMAGE BASED ON STORED IMAGE DATA

(75) Inventors: Moriyuki Koike, Hunabashi; Takahiko Uno, Kawasaki; Tsuyoshi Endoh, Kawasaki; Hisashi Ishiguro, Kawasaki; Kouichi Kanaya, Yokohama; Hiroyasu Sumida; Toshiya Tagawa, both of Ichikawa; Yasuhiro Hattori; Tomohumi Harada, both of Yokohama; Norio Michiie; Hiroomi Motohashi, both of Tokyo-to; Hiroshi Mori, Yamato, all of (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/826,130

(22) Filed: Mar. 27, 1997

(30) Foreign Application Priority Data

Mar. 27, 1996 (JP) .................................................... 8-072851
Nov. 19, 1996 (JP) .................................................... 8-308442

(51) Int. Cl.⁷ .................................................... G06F 15/00
(52) U.S. Cl. ........................... 358/1.9; 358/404; 358/474
(58) Field of Search .................................... 395/565, 562, 395/800, 566, 104, 1.12, 1.13, 1.15, 1.16; 358/468, 443, 505, 530, 296, 1.9, 1.12, 1.13, 1.14, 1.15, 1.16, 1.17; 382/299; 355/8, 14, 25, 82; 347/112, 129, 140

(56) References Cited

U.S. PATENT DOCUMENTS

| | | | |
|---|---|---|---|
| 4,711,554 | * 12/1987 | Nishimori | 355/8 |
| 4,843,405 | * 6/1989 | Morikawa et al. | 346/1.1 |
| 5,280,348 | * 1/1994 | Honma et al. | 358/500 |
| 5,528,361 | * 6/1996 | Sakata | 358/296 |
| 5,530,560 | * 6/1996 | Nakajima | 358/453 |
| 5,559,740 | * 9/1996 | Futami et al. | 365/189.04 |
| 5,731,830 | * 3/1998 | Masuda | 347/112 |
| 5,839,019 | * 11/1998 | Ito | 399/45 |

\* cited by examiner

Primary Examiner—Joseph Mancuso
Assistant Examiner—Douglas Tran
(74) Attorney, Agent, or Firm—Oblon, Spivak, McClelland, Maier & Neustadt, P.C.

(57) ABSTRACT

An image processing apparatus including an input device for inputting image data, a storage device for storing image data from the input device, and a controlling device. The controlling device controls the parallel operations of a) writing image data into the storage device, and 2) reading image data from the storage device. Therefore, fast output is possible. Moreover, in a book copying mode, when copying two facing-pages with a scanner, copies of the first of two facing-pages are printed while the second of the two facing pages is scanned. As a result, this apparatus and the corresponding method enable a document to be changed easily and prevent extended holding times by an operator when using book copy mode.

11 Claims, 14 Drawing Sheets

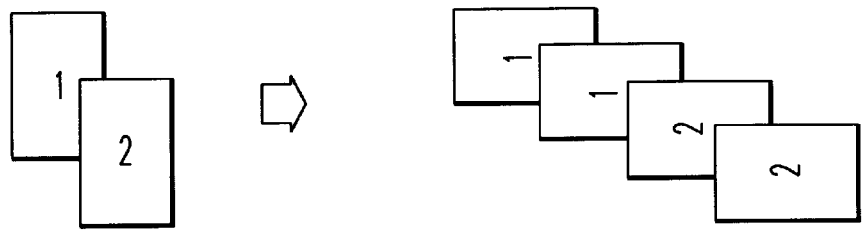
*FIG. 8*  ORIGINAL  COPIES
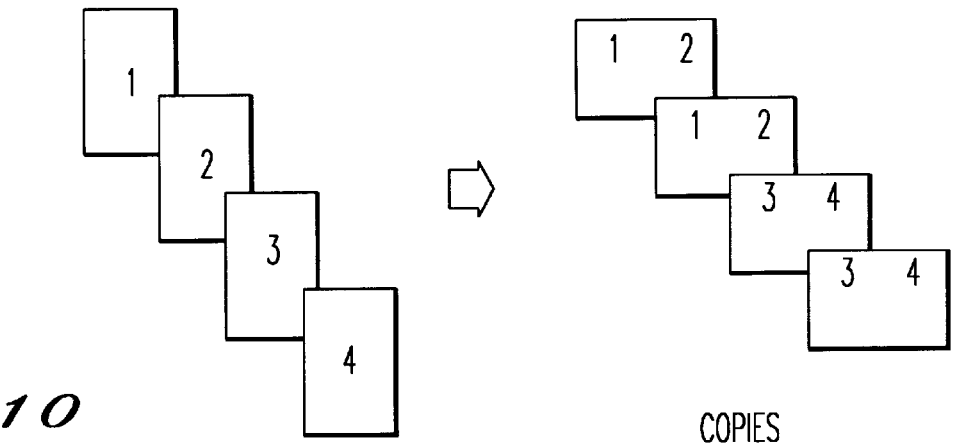
*FIG. 10*  ORIGINAL  COPIES

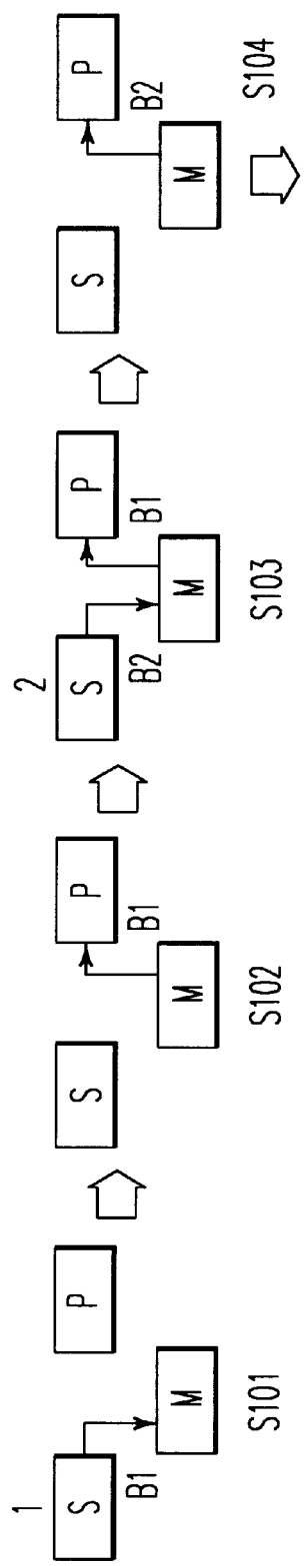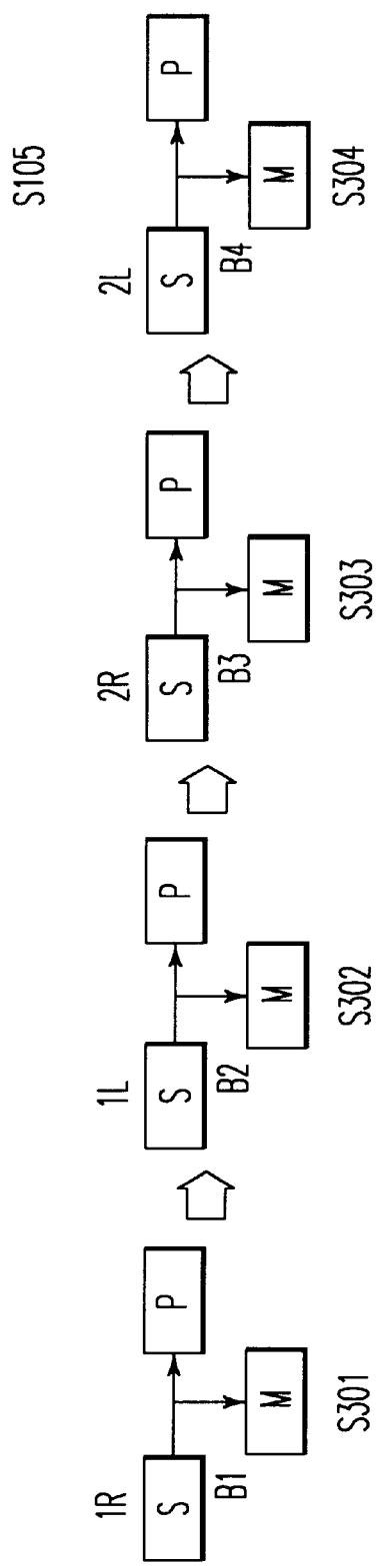
FIG. 9
FIG. 14

IMAGE FORMING APPARATUS WHICH FORMS AN IMAGE BASED ON STORED IMAGE DATA

BACKGROUND OF THE INVENTION

1. Field of the Invention

The present invention relates to an image forming apparatus such as a digital copier, which generates an image based on image data which is stored in an image memory.

2. Discussion of the Background

A digital copier which has a scanner, an image memory and a printer is known. In this digital copier, the scanner scans documents, generates image data from the scanned documents, and stores the image data in the image memory. The printer prints an image on a recording medium (e.g., paper) according to the image data from the scanner or the image memory.

In digital copiers, editing functions are known. Known editing functions include an image rotating function and a combining function which prints two or more images from original documents onto a single recording medium. In the editing function, the scanner reads original documents and the image data from the scanner is stored into the image memory after processing according to the editing function. Then, after storing the image data, the printer prints the edited image on the recording medium according to the edited image data which is stored in the image memory after editing.

However, in this known digital copier, when using the editing function, it takes more time to make copies than compared with copies made without using the editing function because, when using the editing function, the image data is stored into the image memory once after editing, and after storing the image, the stored image is read out and printing is carried out.

Also, a book copying mode is known. The book copying mode is a mode for making copies of a book. In the book copying mode, the book is used as an original document which is set on a document glass. The book is spread open so that both pages are on the document glass, and an image of each page is printed on a different recording medium or on different sides of one recording medium. Hereinafter, when two pages of a book are copied sequentially, the layout of the pages will be called two "facing-pages".

When making one copy in the book copying mode, the scanner reads the image of a first page of two facing-pages and the printer prints the image of the first page according to the image data from the scanner. Next, the scanner reads the image of a second page of the two facing-pages and the printer prints the image of the second page according to the image data from the scanner on a different recording medium or on the opposite side of the recording medium on which was printed the first page of the two facing-pages.

In general, when making more than two copies of documents with this digital copier, the scanner reads a first original document, and the image data from the scanner is stored in the image memory. In parallel with this storing, the printer prints the image on the first recording medium according to the image data from scanner. After that, the printer prints second or subsequent copies according to the image data which is stored in the image memory. After making copies of a first original document, the operation of making copies of second or subsequent original documents is carried out as in case of the making copies of first document.

In the book copying mode, when making more than two copies of a book as original, the scanner reads the image of the first page of two-facing-pages and the image memory stores the image data from the scanner. In parallel with this storing step, the printer prints an image on the first recording medium according to the image data received from scanner. After that, the printer prints the image of the first page of the two facing-pages on a second or subsequent recording medium according to the image data which is stored in the image memory. After the first page of the two facing-pages has printed, the scanner reads the image of a second page of the two facing-pages, and the image data is stored. The image of the second page is printed in the same fashion that the first page of the two facing-pages was printed.

However, in this known digital copier, when making more than two copies of a book in the book copying mode, an operator must hold a book on the document glass while 1) reading the first page of two facing-pages, 2) printing a quantity specified by an operator, and 3) reading the second page of the two facing-pages.

SUMMARY OF THE INVENTION

Accordingly, it is an object of the present invention to provide an image forming apparatus which copies quickly.

It is a further object of the present invention to provide an image forming apparatus which makes changing documents easy and does not require that an operator hold a book open for an extended period of time in book copying mode.

The present invention provides an image processing apparatus having an input device for inputting image data, a storage device for storing the image data from the input device, an output device for outputting the image data from the input device or the storage device, and a controller for controlling the parallel operations of 1) writing image data into the storage device, and 2) reading image data from the storage device.

The present invention provides an image processing apparatus which has a book copying mode for copying two facing-pages, the apparatus includes a scanner for scanning two facing-pages and producing image data of the two facing-pages that were scanned, a storage device for storing the image data from the scanner, a mode selector for selecting the book copying mode, and a controller for controlling, when the book copying mode is selected by the mode selector, 1) scanning the first page of two facing-pages, and 2) scanning the second page of the two facing-pages, wherein the two scannings by the scanner are sequential.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is a diagram showing an example of how multiple copies are created from one set of originals according to one embodiment of the present invention;

FIG. 9 is diagram showing the copying steps that create the multiple copies of FIG. 8;

FIG. 10 is a diagram showing a second example of copying according to one embodiment of the present invention;

FIG. 14 is diagram showing the copying steps that create the multiple copies shown in the third example depicted in FIG. 12;

DESCRIPTION OF THE PREFERRED EMBODIMENTS

Figure 1:
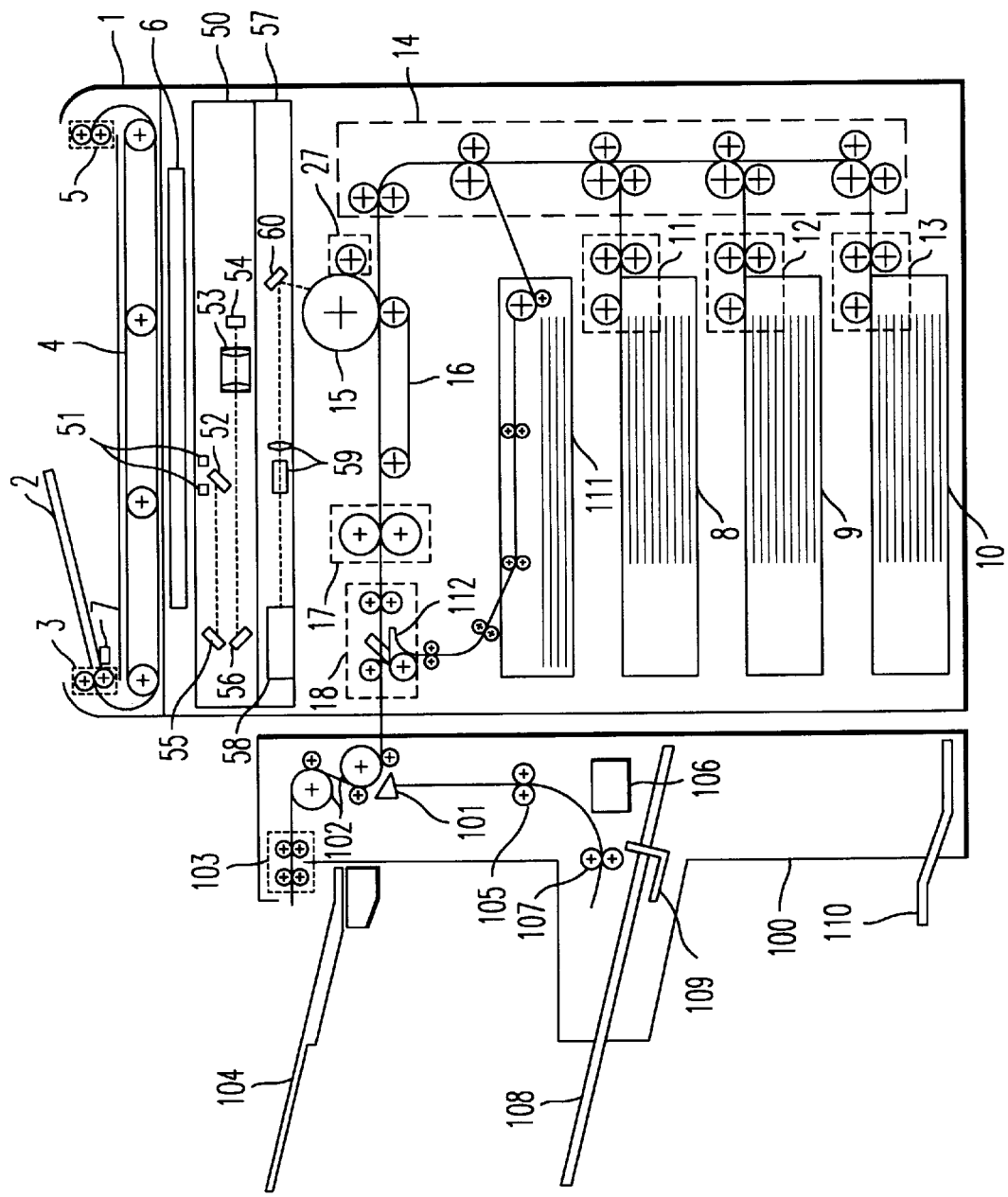
FIG. 1 is a diagram illustrating the construction of a digital copier in one embodiment of the present invention.

Referring now to the drawings, wherein like reference numerals designate identical or corresponding parts throughout the several views, FIG. 1 is a drawing of a section of the digital copier according to a described embodiment of present invention. As would be evident to one of ordinary skill in the art in light of this disclosure, other embodiments are possible; however, for clarity, a single embodiment is described throughout. In an ADF (automatic document feeder) 1, documents are set on a document tray 2 and fed to a predetermined position on a document glass 6 by a feed roller 3 and a feed belt 4. After scanning by a scanner unit 50, the document on the document glass 6 is ejected using the feed belt 4 and an ejection roller 5.

The scanner unit 50 includes an illuminating lamp 51, a first mirror 52, a second mirror 55, a third mirror 56, a, lens 53 and CCD (charge-coupled device) 54. The scanner unit 50 scans an image of the document on the document glass 6. The document which is set on the document glass 6 is illuminated by the illuminating lamp 51. Light reflected from the document is directed at the CCD 54 by the first mirror 52, the second mirror 55, the third mirror 56 and the lens 53. The CCD 54 converts a light signal from the document to an electric signal and outputs the electric signal to an image processing unit. The illuminating lamp 51, the first mirror 52, the second mirror 55 and the third mirror 56 are moved, and the scanner unit 50 reads the entire image of the document.

A writing unit 57 includes a laser unit 58, a lens unit 59 and a mirror 60, and exposes a photoconductive element 15 according to the image data received at the image processing unit. The laser unit 58 includes a laser diode and a polygon mirror which rotates at high speed. A laser light emitted from the laser diode in a laser unit 58 is reflected by the polygon mirror in such a way as to scan, and the laser light is directed at the photoconductive element 15 by the lens unit 59 and the mirror 60. By this exposing, an electrostatic image is formed on the photoconductive element 15. In addition, the laser light is detected by a synchronous detector, and control signals are generated for illuminating the laser diode and inputting/outputting image data.

A printer unit is placed under the writing unit 57. A recording medium (e.g., paper, transparency, envelope) carried by a first tray 8, a second tray 9 or a third tray 10 is fed to the photoconductive element 15 by a first transport 11, a second transport 12, a third transport 13 and a vertical transport 14. The first tray 8, the second tray 9 and the third tray 10 each carry different size (A4, 8.5×11, envelope) recording media.

Further, the electrostatic image on the photoconductive element 15 is developed into a toner image by a developing unit 27. The recording medium which is fed by the vertical transport 14 is fed by transferring belt 16 with the same speed as the photoconductive element 15. The toner image on the photoconductive element 15 then is transferred to the recording medium. The recording medium is fed to a fixing unit 17, and the toner image which was transferred to the recording medium is fixed on the recording medium by the fixing unit 17.

During single-sided copying, after fixing, the recording paper is fed to a finishing unit 100 by an ejection unit 18 and fed to a stacking roller 102 or a stapler roller 105 by a multi-drop apparatus 101. The multi-drop apparatus 101 is a movable apparatus. To feed the stacking roller 102, the multi-drop apparatus 101 rotates down which directs the recording media up, and to feed the stapler roller 105, the multi-drop apparatus 101 rotates up which directs the recording media down. The stacking tray 104 is an output tray which is able to move back-and-forth and sorts recording media by each original document or sorts each copy by using an image memory.

The recording media fed to the stapler roller 105 are ejected to a staple tray 108 by a stapler feed roller 107. On the stapler tray 108, the recording media are evened at the edges by a jogging unit 109 and stapled by a stapling unit 106. The recording media which are stapled are stored in a stapled output tray 110.

On the other hand, for double-sided copying, the recording medium with a formed image (i.e., that has been copied on one side) is guided to a double-sided tray 111 by the multi-drop apparatus 112 and stacked temporarily. Next, the recording medium which is stacked in the double-sided tray 111 is fed to the photoconductive element 15 again and, after image forming, is output to the finishing unit 100.

Figure 2:
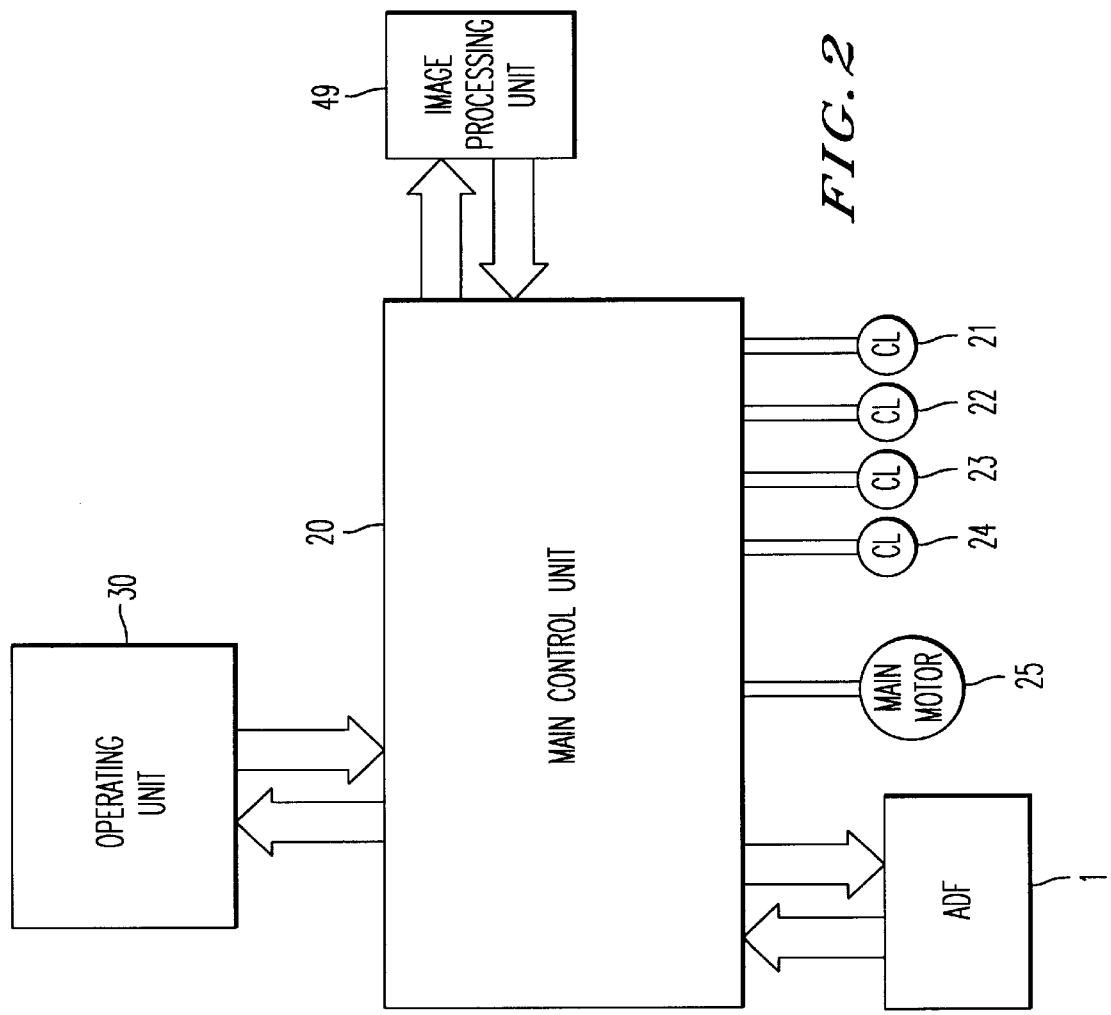
FIG. 2 is a block diagram of a control unit of the digital copier in one embodiment of the present invention.

FIG. 2 is a block diagram of control units of the digital copier according to this embodiment. A main control unit 20 controls other units including: an operating unit 30 which controls displaying information to an operator and inputting commands by the operator; an image processing unit 49 which controls the scanner 50 and controls access to an image memory; and an ADF 1. Further, the main control unit 20 controls a main motor 25, clutch (CL) 21, CL 22, CL 23 and CL 24. These clutches control transferring power from the main motor 25 to each apparatus, for example, the photoconductive elements 15, the developing unit 27, each roller, etc.

Figure 3:
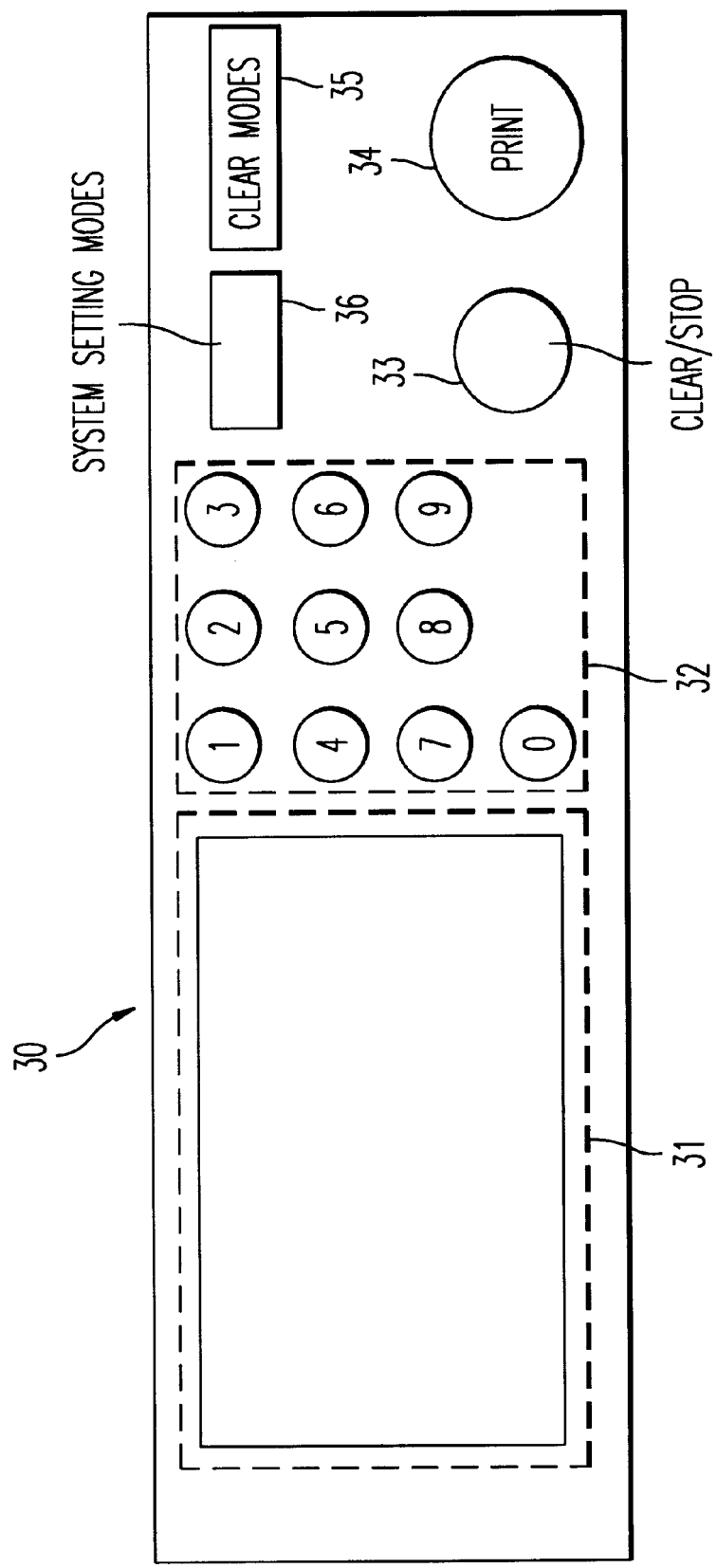
FIG. 3 is a diagram of an operating unit of the digital copier in one embodiment of the present invention.

FIG. 3 is a diagram of an operating unit of this embodiment. The operating unit 30 includes a LCD 31, number keys 32, a clear/stop key 33, a print key 34, a clear mode key 35 and a system setting mode key 36. The LCD 31 includes a touch panel on the surface and displays function keys, a quantity selected, and messages of the condition of the apparatus.

Figure 4:
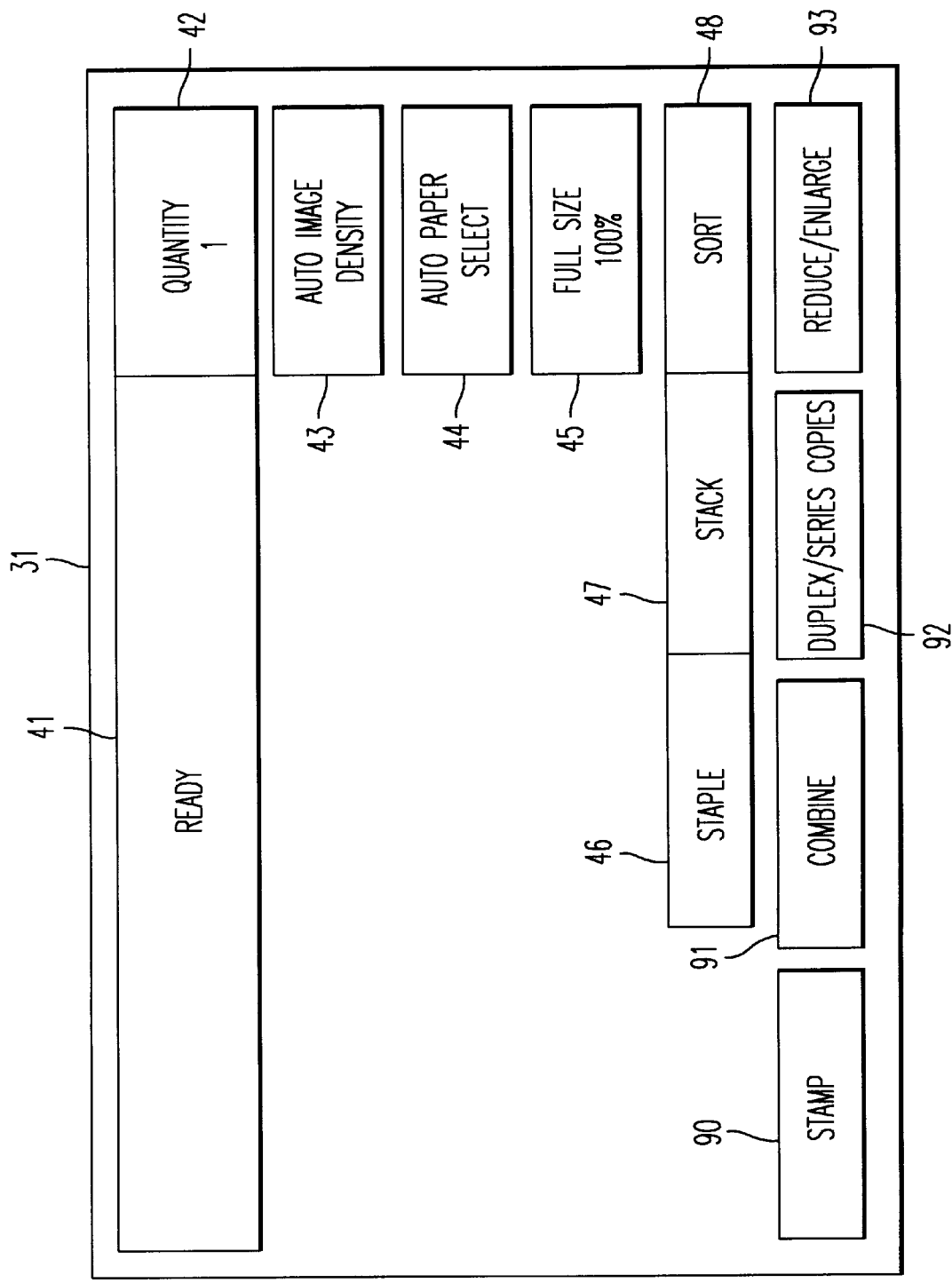
FIG. 4 is a sample screen of a liquid crystal display (LCD) in the an operating unit of the digital copier in one embodiment of the present invention.

FIG. 4 shows a sample screen of the LCD 31. By touching a function key displayed on the LCD 31, the function indicated on the function key is selected and the selected key is displayed in reverse video. To specify details of the selected function, for example, to select a value by which to reduce or enlarge when the operator selects reduction/enlargement, a detail setting screen is displayed after touching a function key. On the sample screen shown in FIG. 4, a message area 41 is displayed. In the message area 41, a message is displayed, for example "READY" or "WAIT". Also displayed are a quantity number display area 42; an auto image density key for selecting a function of auto image density; an auto paper select key 44 for selecting a function of auto paper selecting; and a full size (100%) key 45 for selecting normal size. Additionally displayed are a staple key 46 for selecting a stapling function; a stack key 47 for selecting a stacking function; a sort key 48 for selecting a sorting function; a stamp key 90 for selecting a function of stamping some characters, for example, date and/or page number; a combine key for selecting a combining function; a duplex/series copy key for selecting a duplex function; and a reduce/enlarge key 93 for selecting reduction or enlargement.

Figure 5:
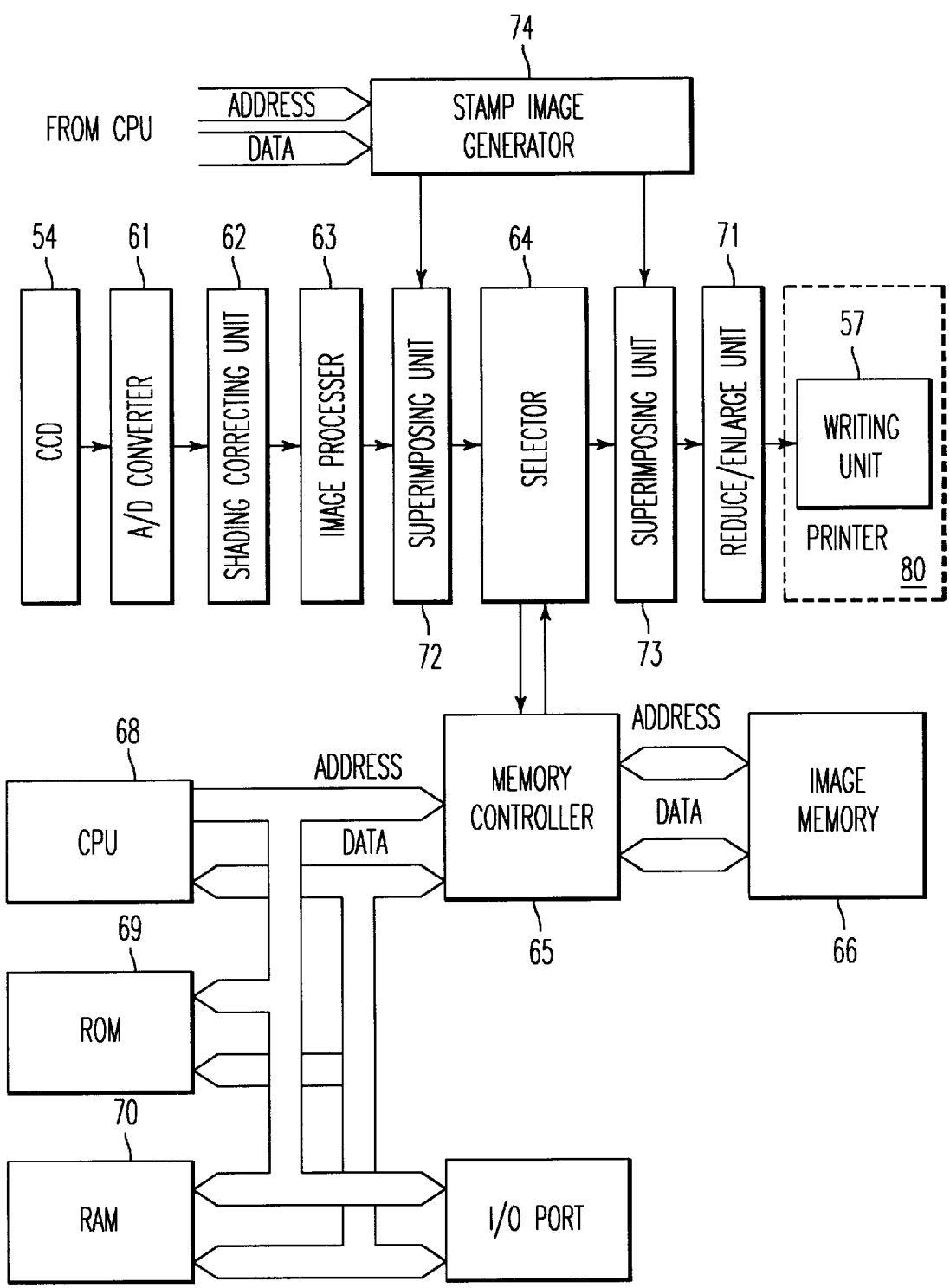
FIG. 5 is a block diagram of an image processing unit of the digital copier in one embodiment of the present invention.

FIG. 5 is a block diagram of an embodiment the image processing unit 49. The CCD 54 converts the reflected light from the document to image data, and the image data is converted from analog data to digital data by an A/D converter 61. Next, after shading correction by a shading correcting unit 62, the image data is sent to an image processor 63. At the image processor, an MTF correction and a gamma correction are carried out.

A selector 64 selects output units, a superimposing unit 73 or a memory controller 65. When the superimposing unit 73 is selected, the image data is sent to a reduction/enlargement unit 71 by way of the superimposing unit 73. After reducing or enlarging at the reduction/enlargement unit 71, the image data is sent to the writing unit 57 in printer 80.

A central processing unit (CPU) 68, and controls reading and writing image data using the memory controller 65. Moreover, the CPU 68 controls the scanner 50 and the writing unit 57. A ROM 69 is a read-only memory and stores data which includes a control program for the CPU 68. A RAM 70 is a random access memory and stores data temporarily.

A stamp image generator 74 is connected to a CPU bus and generates character image data for printing page numbers and image data of a chosen stamp image. An example of a stamp image is an image displaying "CONFIDENTIAL" or "DRAFT". The image data which is generated by the stamp image generator is sent to a superimposing unit 72, 73 and superimposed upon the image data from the image processor or the memory controller 65.

Figure 6:
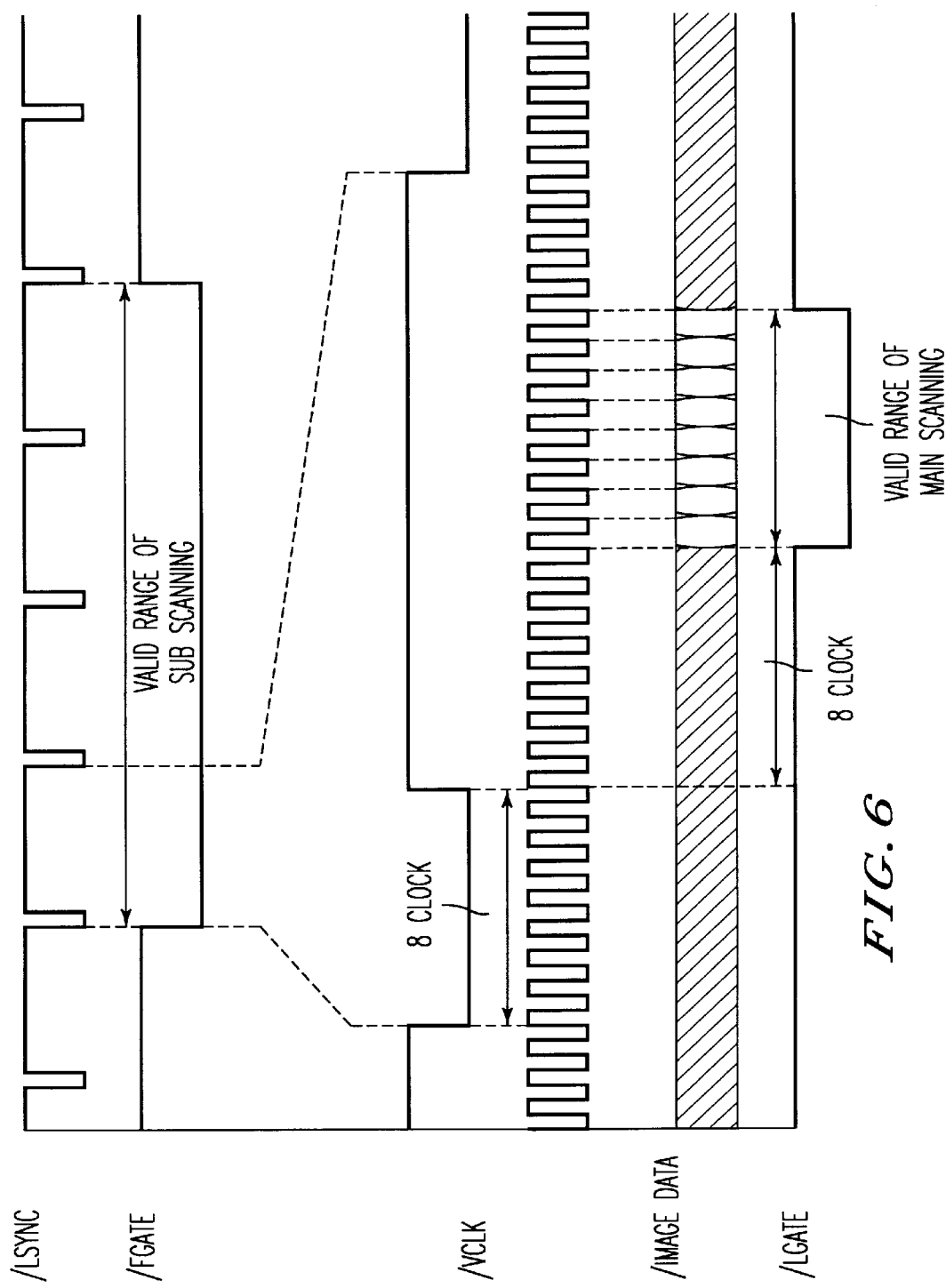
FIG. 6 is a timing diagram of control signals of an image processing unit of the digital copier in one embodiment of the present invention.

FIG. 6 is a timing diagram of control signals of an embodiment of the image processing unit 49. A /LSYNC signal ("/" indicates an active low signal) is a main scanning synchronization signal. A /FGATE signal is a frame gate signal and sets a valid range for sub-scanning. A /LGATE signal is a line gate signal and sets a valid range of main scanning. The /LSYNC, /FGATE and /LGATE are synchronized with VCLK and one pixel of image data is sent every pulse of VCLK. The image processing unit 49 has generators for /LSYNC, /FGATE and /LGATE for inputting and outputting each.

Figure 7:
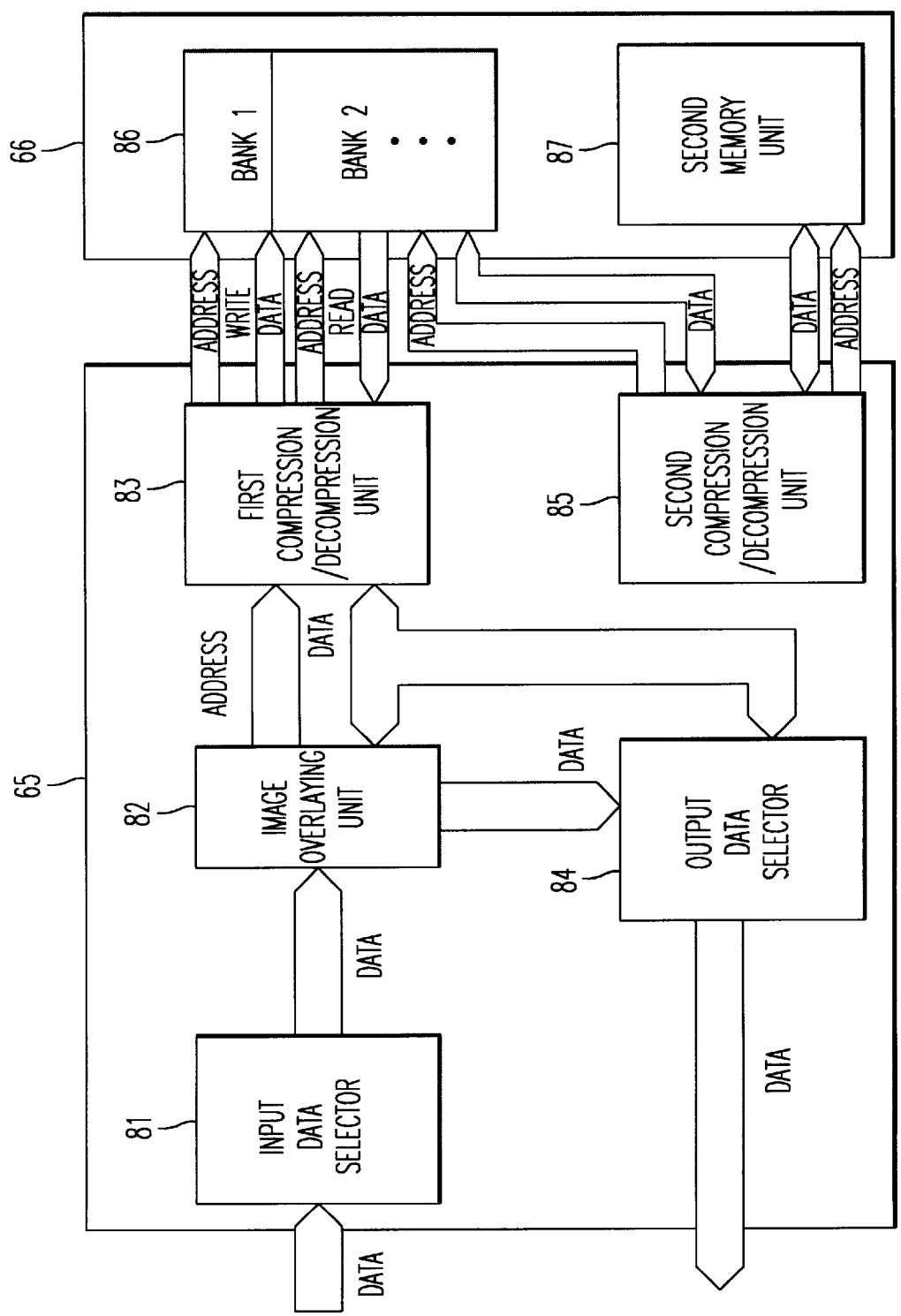
FIG. 7 is a diagram of a memory controller and an image memory of the digital copier in one embodiment of the present invention.

FIG. 7 is a diagram of the memory controller 65 and the image memory 66. The memory controller 65 includes an input data selector 81, an image overlaying unit 82, a first compression and decompression unit 82, an output data selector 84 and a second compression and decompression unit 85. Each unit is controlled by the CPU 68.

The image memory 66 includes a first memory unit 86 and a second memory unit 87. The first memory unit 86 includes a memory (e.g., SRAM or DRAM) which can be accessed quickly and synchronized with data transfers, i.e., when writing image data and reading image data. The first memory unit 86 is divided into a number of banks according to a size of an image, and reading image data and writing image data is carried out in parallel. More specifically, the memory controller 65 and the image memory 66 are connected by two sets of address and data buses. The first set is for reading image data and the second set is for writing image data. Therefore, it is possible to write image data to bank1 and read data from bank2 in parallel.

The second memory unit 87 is used for image overlaying, sorting and ordering by storing image data from the scanner unit 50. The second memory, for example, a HDD (hard disk drive) or a magento-optic (MO) disk, includes a slower, lower cost memory but includes a large amount of storage. Reading and writing data is carried out away from the first memory unit 86. Therefore, reading, writing and editing a large amount of image data is possible at a low cost.

To quickly write image data into the image memory 66, the input data selector 81 receives data from the image data which is sent from the scanner unit 50 by way of the image processing unit 49. The image data which is received by the input data selector 81 is transferred to the image overlaying unit 82. In image overlaying unit 82, the transferred image data is overlayed with the image data which is stored in the image memory 66 as necessary. After that, the image data is output to the first compression/decompression unit 83.

In the first compression and decompression unit 83, image data is compressed and afterwards, compressed image data is written into the first memory unit 86 in the image memory 66. The data stored in the first memory unit 86 is, as necessary, compressed further in the second compression and decompression unit 85, and compressed image data is written into the second memory unit 87.

To read image data from the image memory 66, when image data is stored in the first memory unit 86, the image data which was read is sent to the first compression and decompression unit 83 and decompression is carried out. After decompression, decompressed image data or decompressed image data which is overlaid with an image data from the scanner unit 50 is selected by the output data selector and selected image data is output.

The image overlaying unit 82 overlays the image data from the image memory 66 and the image data from the scanner unit 50 with aligned and selects output units from 1) the first compression and decompression unit 83, 2) the output data selector 84, or 3) both.

When read image data is stored in the second memory unit 87, after having read the image data, the read image data is sent to the second compression and decompression unit 85 and is decompressed. After decompression, decompressed image data is stored as the first image data 86 and the above process is carried out.

FIG. 8 is a diagram showing an example of creating multiple copies from one set of originals according to this embodiment, and FIG. 9 is a diagram showing the copying steps that create the multiple copies of FIG. 8. In FIG. 8, the operator selects to generate two rotated copies of two original documents by selecting the rotate function from the operating unit 30.

In FIG. 9, the scanner unit 50 is indicated with a box labeled S, the image memory 66 is indicated with a box labeled M, and the printer 80 is indicated with a box labeled P. The number above the box labeled S indicates an image number of the original documents which is being scanned by the scanner unit 50. The legend at the upper left of the box labeled M indicates into which memory bank of image memory 66 an image is written, and the legend at the upper right of the box labeled M indicates from which memory bank of image memory 66 an image is read.

FIG. 9 starts with step S101, where, after two original documents are set on the ADF 1 and the print key 34 (shown in FIG. 3) is selected, a first original document is fed by ADF 1 and read by the scanner unit and then the read image data is written into bank B1 of the image memory 66. At step S102, the image data which was written into bank B1 of the image memory 66 is read out, rotated, and sent to the printer, thereby generating a first rotated copy of the first image shown in FIG. 8. Next, at step S103, a second original document is read by the scanner unit 50 and the image data read by the scanner unit 50 is written into bank B2 of the image memory 66. In parallel with writing to bank B2, the first original document image data which was written into bank B1 of the image memory is read out, rotated and sent to the printer again, generating a second copy of the first image. At steps S104 and S105, the second original document image data which was written into bank B2 of the image memory 66 (in step S103) is rotated and sent to the printer.

Figure 11:
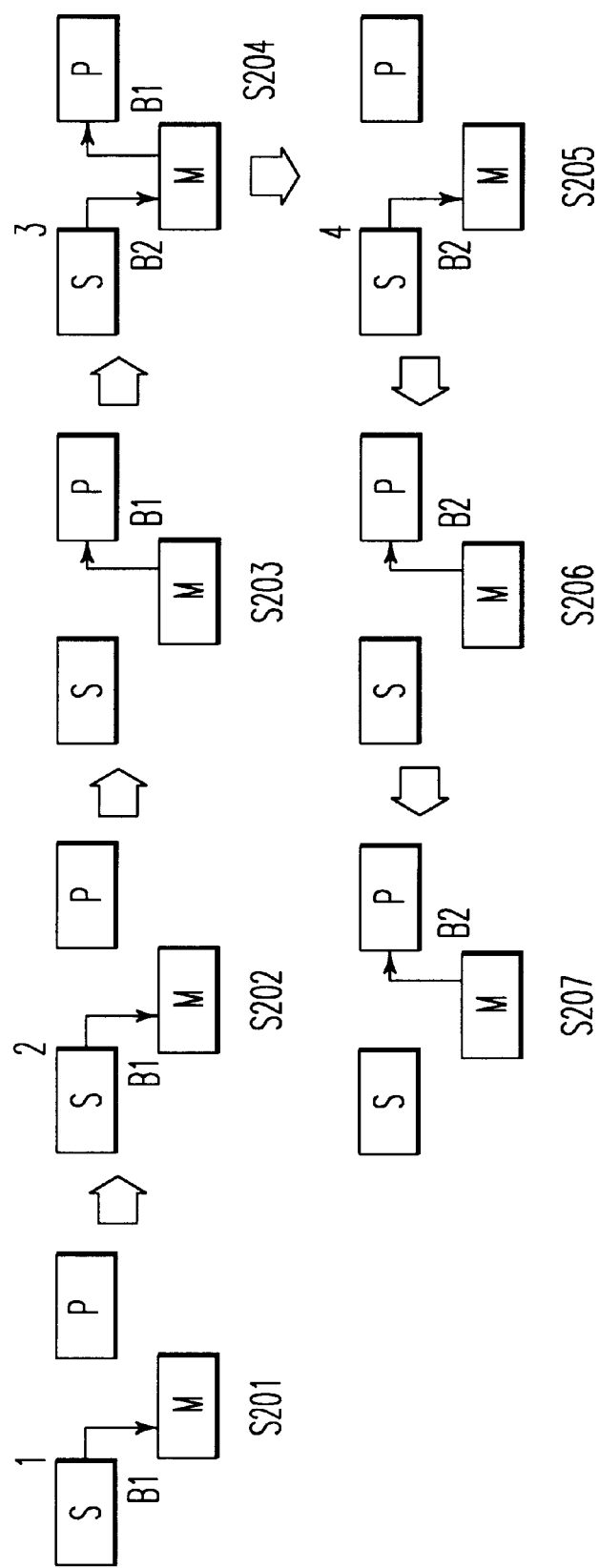
FIG. 11 is diagram showing the copying steps that create the facing-pages copies of FIG. 10.

FIG. 10 is a diagram showing a second example of copying according to this embodiment, and FIG. 11 is a diagram showing the copying steps that create the facing-pages copies of FIG. 10. In FIG. 10, the operator selects to generate two copies of four original documents by selecting the combine function from the operating unit 30. Using the combine function, two original documents are combined and printed on one side of a single recording medium.

FIG. 11 shows step S201 where, after four original documents are set on the ADF 1 and the print key 34 (shown in FIG. 3) is selected, a first original document is fed by ADF 1 and read by the scanner unit 50, and then the read image data is written into bank B1 of the image memory 66. At step S202, a second original document is fed by ADF 1 and read by the scanner unit, and its corresponding image data also is written into bank B1 of the image memory 66.

At step S203, the image data of the first and second original documents which was written into bank B1 of the image memory 66 (in steps S201 and S202) is read out and sent to the printer. The printer prints the image of the first and second original documents on one recording medium according to the data of bank B1 to create the first facing-pages copy.

Next, at step S204, two parallel sub-steps are performed whereby 1) a third original document is read by the scanner unit 50 and the read image data is written into bank B2 of the image memory, and 2) the image data of the first and second original documents previously written into bank B1 of the image memory (in steps S201 and S202) is read out and sent to the printer. The sub-step 2) produces the second facing-pages copy.

At step S205, a fourth original document is fed by ADF 1 and read by the scanner unit 50, and then the read image data is written into bank B2 of the image memory 66. At steps S206 and S207, the image data of the third and forth original documents which was written into bank B2 of the image memory (in steps S204 and S205) is read out and sent to the printer, thereby creating the second two facing-pages copies shown in FIG. 10.

Figure 12:
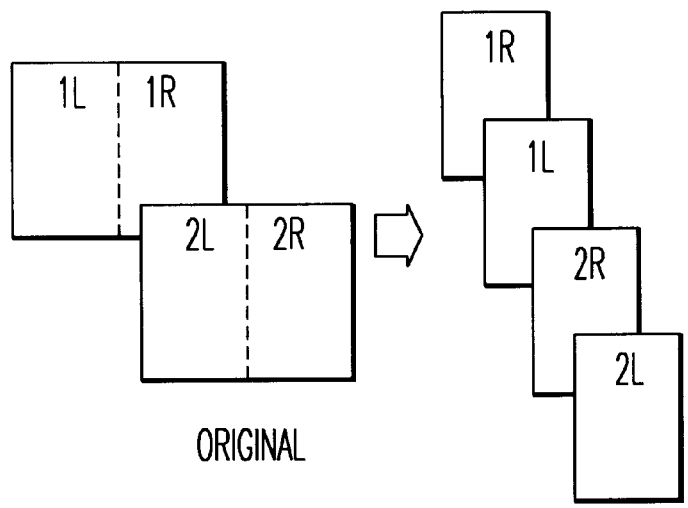
FIG. 12 is a diagram showing a third example of copying according to one embodiment of the present invention.
Figure 13:
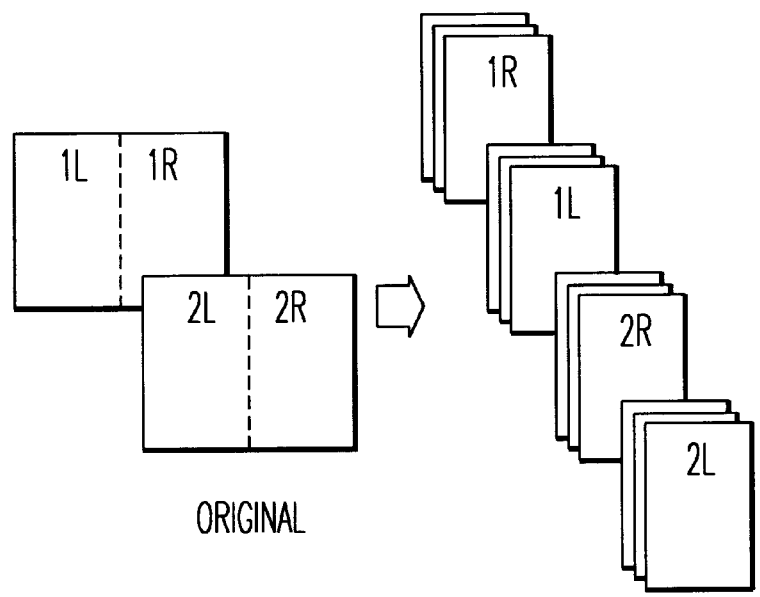
FIG. 13 is a diagram showing a fourth example of copying according to one embodiment of the present invention.
Figure 15:
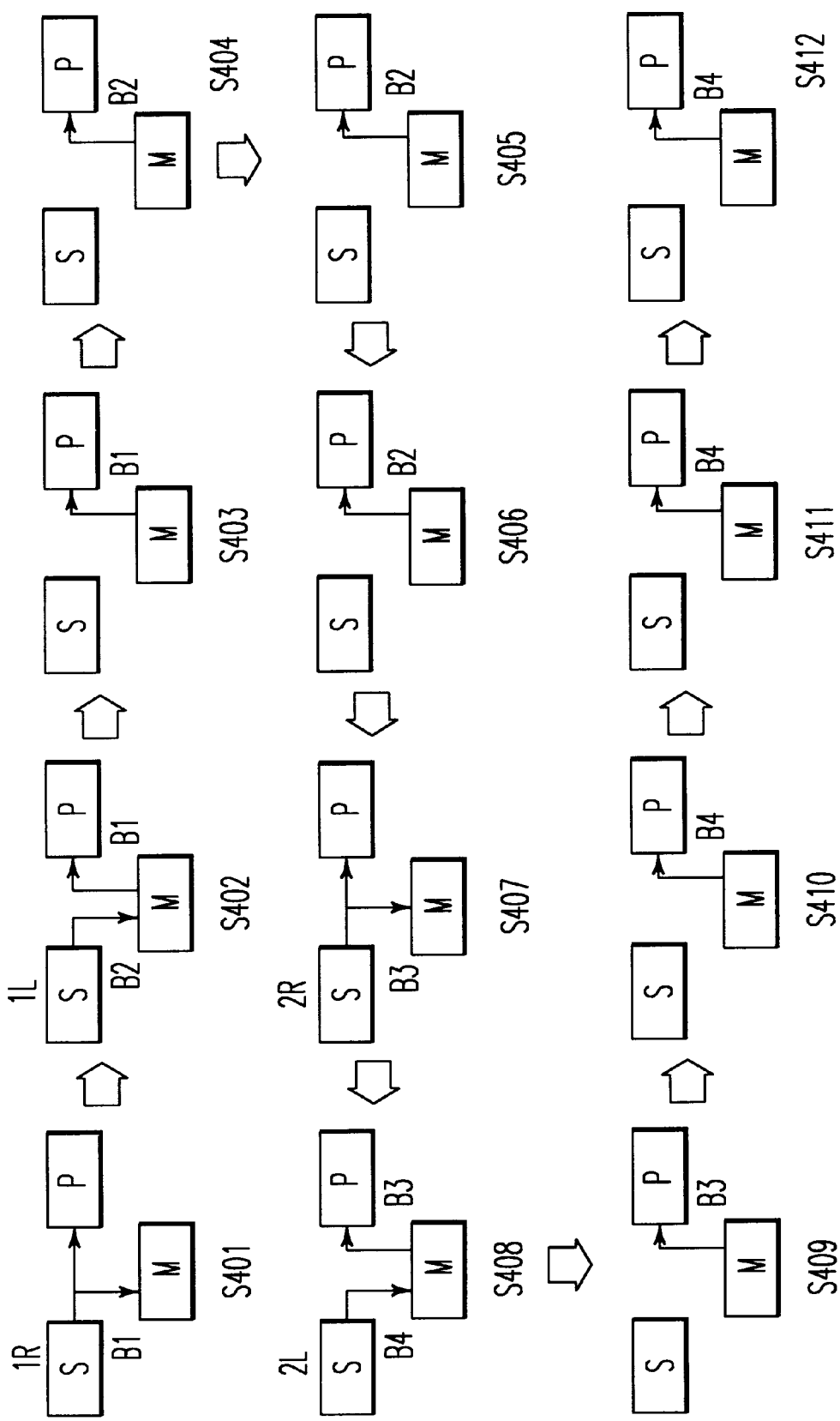
FIG. 15 is diagram showing the copying steps that create the multiple copies shown in the fourth example depicted in FIG. 13.

FIGS. 12 and 13 are diagrams showing the third and fourth examples of copying in the book copying mode according to this embodiment. In FIGS. 12 and 13, L indicates a left side page of two facing-pages of an original document and R indicates a right side page of the two facing-pages of the original document. FIG. 14 is a diagram showing the copying steps that create the individual copies shown in FIG. 12, and FIG. 15 is a diagram showing the copying steps that create the groups of individual copies shown in FIG. 13. In FIG. 12, the operator selects three copies of the same two original documents which are facing-pages by selecting the book copying mode from the operating unit 30, and in FIG. 13, the operator selects three copies of the same original documents using the operating unit 30.

FIG. 14 begins with step S301 where, after a first original two facing-pages document is set on the document glass 6 (FIG. 1) and the print key 34 (FIG. 3) is selected, the right side page of the two facing-pages on the document glass 6 is read by the scanner unit. The image data is printed on a first recording medium and written into bank B1 of the image memory. The image data is written to bank B1 in case of a paper jam or other error in the printer. When a printer error occurs, re-scanning is not necessary since reprinting is carried out by using the image data which was stored in the image memory.

Next, at step S302, the left side page of the first original two facing-pages document on the document glass 6 is read by the scanner unit 50. The image data read by the scanner is written into bank B2 of the image memory and printed on a second recording medium.

In step S303, the second original two facing-pages document is set on the document glass 6 (FIG. 1) and the print key 34 (FIG. 3) is selected, the right side page of the second original document is read by the scanner unit 50. The image data read by the scanner is written into bank B3 of the image memory and printed on a third recording medium. Next, at step S304, the left side page of the second original document is read by the scanner unit: 50. The image data read by the scanner unit is written into bank B4 of the image memory and printed on a fourth recording medium. In FIG. 14, it is not necessary to read out image data from the image memory and write data into the image memory in parallel.

FIG. 15 starts with step S401, where, after the first original facing-pages document is set on the document glass and the print key 34 is selected, the right side page of the first original document on the document glass 6 is read by the scanner unit 50. The image data read by the scanner unit 50 is written into bank B1 of the image memory and printed on a recording medium as a first copy.

At step S402, the left side of the first original document is read by the scanner unit 50 and the image data read by the scanner unit 50 is written into bank B2 of the image memory, and the right side page of the first original document which was written into bank B1 of the image memory (in step S401) is read out and printed on a recording medium as a second copy. The system carries out in parallel the above sub-steps of 1) writing into bank B2 of the image memory and 2) reading out from bank B1 of the image memory.

At step S403, the image of the right side of the first original document is printed on a recording medium as a third copy using the image data which is stored in bank B1. At step S404, the image of the left side of the first original document is printed on a recording medium as first copy according to the image data which is stored in bank B2. At steps S405 and S406, second and third copies of the image of the left side of the first original document are printed on respective recording media using the image data which was stored in bank B2.

During steps S403 through S406, the scanning unit is idle and an operator has sufficient time to change from the first original document to a second original facing-pages document.

After changing from the first original document to the second original document, at step S407, the right side page of the second original document on the document glass 6 is read by the scanner unit 50. The image data read by the scanner unit is written into bank B3 of the image memory and a first copy is printed on a recording medium.

At step S408, the left side of the second original document is read by the scanner unit and the image data is written into bank B4 of the image memory. Simultaneously, the right side page of the second original document (which was written into bank B3 of the image memory in step S407) is read out and printed on a recording paper as a second copy. The system carries out in parallel the sub-steps of 1) writing into bank B4 of the image memory, and 2) reading out from bank B3 of the image memory.

At step S409, a third copy of the right side of the second original document is printed on a recording medium using the image data which was stored in bank B3. At step S410, a first copy of the image of the left side of the second original document is printed on a recording paper using the image data which is stored in bank B4. At steps S411 and S412, second and third copies of the image of the left side of the second original document are printed on respective recording media using the image data which is stored in bank B4. After S407, the scanning unit is idle and an operator is not required to hold the book on the document glass.

Figure 16:
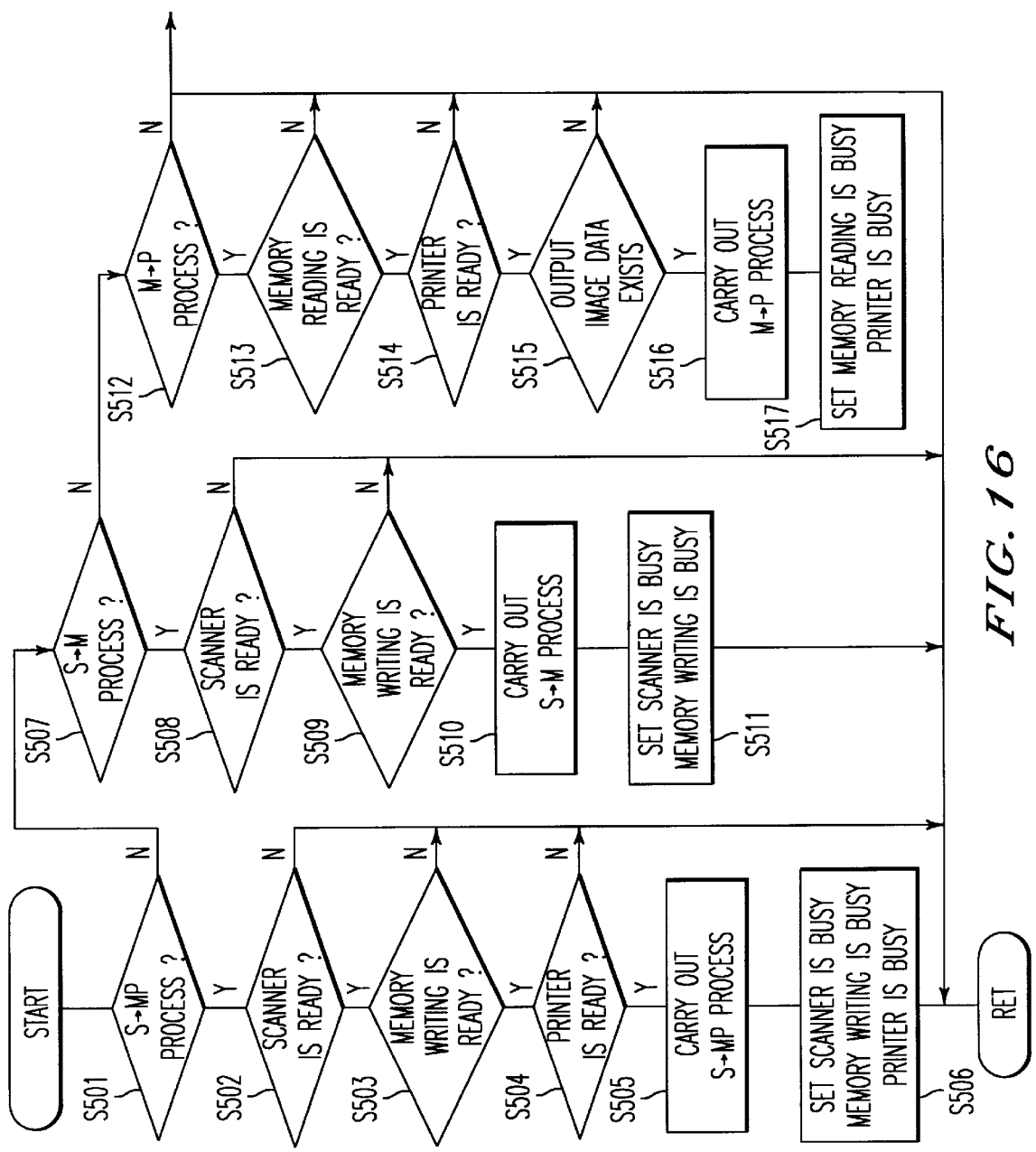
FIG. 16 is a flowchart showing the control process performed by the control unit in one embodiment of the present invention.

FIG. 16 is a flowchart showing the internal control process of the control unit of this embodiment. In the flowchart, the scanner 5 can transfer image data to both the memory M and the printer P simultaneously, or to either individually. In FIG. 16, the transfer labeled S→MP indicates that the image data which is read by scanning unit is sent to both the image memory and the printer, wherein it is written into the image memory and printed on a recording medium. One example of this process step is step S401 shown in FIG. 15. The transfer labeled S→M indicates that the image data which is read by scanning unit is written into the image memory. One example of this process step is step S101 shown in FIG. 9. The transfer labeled M→P indicates that the image data which is stored in the image memory is read out and printed on a recording medium.

Figure 17:
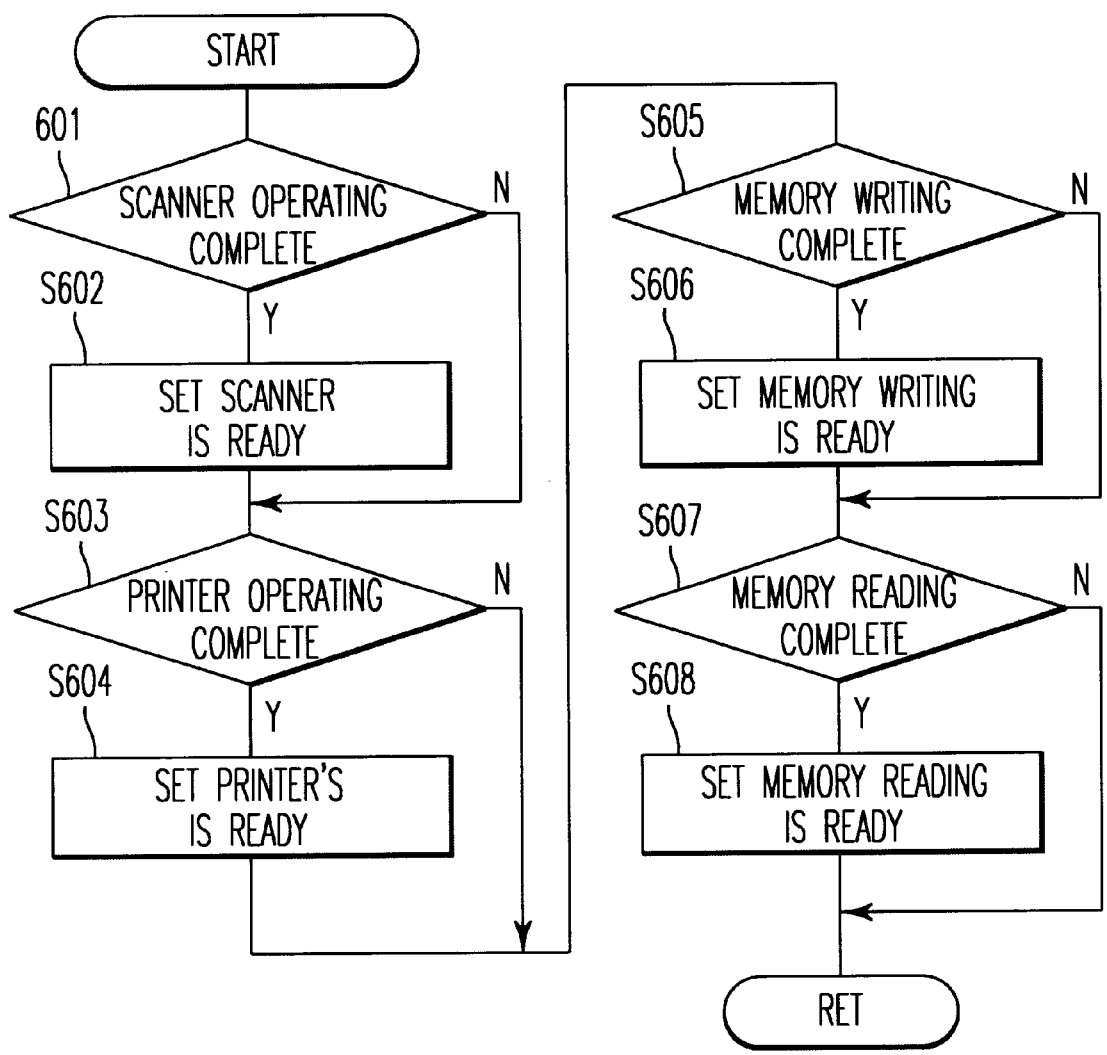
FIG. 17 is a flowchart for displaying the status of the digital copies according to one embodiment of the resent invention.

As part of a main control loop, the system executes a first subroutine that includes the steps of FIG. 16. After returning to the main control loop, a second subroutine which includes the steps of FIG. 17 is executed. After returning from the last step of FIG. 17, the main control loop restarts and re-executes the first subroutine. In the first subroutine, at step S501, it is determined whether or not the next transfer is to both the memory and the printer. When the next step is an S→MP transfer, control transitions to step S502. At step S502, when the scanner unit status is ready, control transitions to step S503. At step S503, when the memory writing status is ready, control transitions to step S504. At step S504, when the printer status is ready, control transitions to step S505. At step S505, the S→MP transfer is carried out and control transitions to step S506. At step S506, the scanner unit status, the memory writing status and the printer status are set to busy, and the first subroutine returns control to the main control loop. In addition, when any one of the scanner unit status, the memory writing status and the printer status is not ready, the first subroutine returns to the main control loop.

At step S501, when the next transfer step is not a S→MP process, control transitions to step S507. At step S507, when the next transfer step is a S→M process, control transitions to step S508. At step S508, when the scanner unit status is ready, control transitions to step S509. At step S509, when the memory writing status is ready, control transitions to step S510. At step S510, the S→M transfer is carried out and control transitions to step S511. At step S511, the scanner unit status and memory writing status are set busy, and the first subroutine returns. When at least one of the scanner unit status and the memory writing status is not ready, the first subroutine returns.

At step S507, when the next step is determined not to be a S→M transfer, control transitions to step S512. At step S512, when the next step is a M→P transfer, control transitions to step S513. At step S513, when memory reading status is ready, control transitions to step S514. At step S514, when the printer status is ready, control transitions to step S515. At step S515, when output image data exists, control transitions to step S516. At step S516, the M→P transfer is carried out and control transitions to step S517. At step S517, the memory reading status and the printer status are set busy, and the first subroutine returns. When at least one of the memory reading status and the printer status is not ready, or when the output image data does not exist, the first subroutine returns.

In this flowchart, after an M→P transfer starts, and when the next step is a S→M transfer, the S→M process is carried out immediately because at steps S508 and S509, the scanner unit status and the memory writing status are ready. Therefore, M→P process and S→M process are carried out in parallel.

FIG. 17 is a flowchart showing how the status is updated in this embodiment. At step S601, when a scanner operation finishes, control transitions to step S602. At step S602, the scanner status is set ready and control transitions to step S603. At step S603, when a printer operation finishes control transitions to step S604. At step S604, the printer status is set ready and control transitions to step S605. At step S605, when a memory writing operation completes, control transitions to step S606. At step S606, the memory writing status is set ready and control transitions to step S607. At step S607, when a memory reading operation completes, control transitions to step S608. Lastly, at step S608, the memory reading status is set ready and the second subroutine returns. In an alternate embodiment of the main control loop and the first and second subroutines, the first and second control are interleaved into a single subroutine or made part of the main control loop such that if a device is not ready then the device is polled until the device is ready. For example, in a modified step S514, if the printer is not ready, then control would pass to a waiting step rather than to the step which causes the first subroutine to return. By waiting, the system avoids the rechecking steps of S501, S507, S512, and S513.

This invention may be conveniently implemented using a conventional general purpose digital computer or a microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of an application specific integrated circuit or by interconnecting an appropriate network of conventional components, as will be readily apparent to those skilled in the art.

This application is based on Japanese patent application 8-72851 filed in the Japanese Patent Office on Mar. 27, 1996 and Japanese patent application 8-308442 filed in the Japanese Patent Office on Nov. 19, 1996 the entire contents of which are hereby incorporated by reference.

What is claimed as new and desired to be secured by Letters Patent of the United States is:

1. An image processing apparatus comprising:

feeding means for feeding document sheets to a scanning position one sheet at a time;

scanning means for scanning document sheets which are fed by said feeding means and for generating image data of the scanned document sheets;

storing means for storing the image data from said scanning means;

outputting means for outputting the image data from one of said scanning means and said storing means; and controlling means for controlling, after storing image data of a first sheet of the document sheets into said storing means, parallel operations of (a) reading image data of the first sheet of the document sheets from said storing means plural times to form plural copies of the first sheet, and (b) writing image data of a second sheet of the document sheets into said storing means, wherein the controlling means controls the feeding means, the scanning means and the storing means such that, while the image data of the first sheet of the document sheets is being read out from the storing means, the feeding means feeds the second sheet of the document sheets to the scanning position and the storing means stores the image data of the second sheet generated by scanning with the scanning means the second sheet fed by the feeding means.

2. The apparatus as claimed in claim 1, wherein the image data is rotated by a right angle when the image data is read from the storing means.

3. The apparatus as claimed in claim 1, wherein the storage means stores image data representing a plurality of pages.

4. An image processing apparatus which has a book copying mode for copying two facing-pages, the image processing apparatus comprising:

scanning means for scanning a first set of two facing-pages and generating image data of the scanned first set of two facing-pages;

storing means for storing the image data from said scanning means;

quantity inputting means for inputting a quantity of copies;

outputting means for outputting the image data from said storing means;

mode selecting means for selecting the book copying mode; and controlling means for controlling, when the book copying mode is selected by said mode selecting means and when the quantity input by the quantity inputting means is at least two, operations (a) through (d), wherein the operation (a) includes scanning a first page of the first set of two facing-pages and storing the scanned first page in the storing means, operation (b) includes scanning a second page of the first set of two facing-pages and storing the scanned second page in the storing means, operation (c) includes outputting the quantity of the first page, and operation (d) includes outputting the quantity of the second page, wherein the operations (b) and (c) are performed in parallel.

5. An image processing apparatus comprising:

feeding means for feeding document sheets to a scanning position one sheet at a time;

scanning means for scanning document sheets which are fed by said feeding means and for generating image data of the scanned document sheets;

storing means for storing the image data from said scanning means;

outputting means for outputting the image data from one of said scanning means and said storing means; and controlling means for controlling, after storing image data of first and second sheets of the document sheets into said storing means, parallel operations of (a) reading combined image data of the first and second sheets from said storing means to form plural copies of the first and second sheets combined, and (b) writing image data of at least one of third and fourth sheets of the document sheets into said storing means, wherein the controlling means controls the feeding means, the scanning means, and the storing means such that, while the combined image data of the first and second sheets of the document sheets is being read out from the storing means, the feeding means feeds the third sheet of the document sheets to the scanning position and the storing means stores the image data of the third sheet generated by scanning with the scanning means the third sheet fed by the feeding means.

6. The apparatus as claimed in claim 4, wherein the controlling means further comprises:

a controller for causing the scanning means to scan a second set of two facing-pages while the controlling means performs at least one of the sequential operations of (b1) and (b2).

7. An image processing method comprising:

feeding document sheets to a scanning position of a scanning device one sheet at a time;

scanning document sheets in the scanning device and generating image data of the scanned document sheets;

storing into a digital storage device the image data generated from the scanned document sheets; and controlling, after storing image data of a first sheet of the document sheets into the digital storage device, parallel operations of (a) reading image data of the first sheet of the document sheet from the digital storage device plural times to form plural copies of the first sheet, and (b) writing image data of a second sheet of the document sheets into the digital storage device, wherein, while the image data of the first sheet of the document sheets is being read out from the digital storage device, the operations of: (1) feeding the second sheet of the document sheets to the scanning position using a sheet feeder, (2) scanning the second sheet, and (3) storing, into the digital storage device, the image data of the second sheet, fed by the sheet feeder, are performed.

8. The method as claimed in claim 7, wherein the step of controlling comprises rotating the image data by a right angle when the image data is read from the digital storage device.

9. The method as claimed in claim 7, wherein the digital storage device stores image data representing a plurality of pages.

10. An image processing method for copying two facing-pages in a book copying mode, the method comprising the steps of:

scanning a first set of two facing-pages and generating image data of the scanned first set of two facing-pages;

storing into a digital storage device the image data generated from the scanned first set of two-facing pages;

inputting a quantity of copies;

selecting the book copying mode;

controlling, when the book copying mode is selected and when the quantity of copies is at least two, operations (a) through (d), wherein the operation (a) includes scanning a first page of the first set of two facing-pages and storing the scanned first page in the storing means, operation (b) includes scanning a second page of the first set of two facing-pages and storing the scanned second page in the storing means, operation (c) includes outputting the quantity of the first page and operation (d) includes outputting the quantity of the second page, wherein the operations (b) and (c) are performed in parallel.

11. The method as claimed in claim 10, further comprising the step of scanning a second set of two facing-pages while performing the sequential operations of (b1) and (b2).

* * * * *